(12) United States Patent
Durkee et al.

(10) Patent No.: US 12,180,004 B2
(45) Date of Patent: Dec. 31, 2024

(54) AUTONOMOUS STORAGE AND RETRIEVAL TOWER

(71) Applicant: Walmart Apollo, LLC, Bentonville, AR (US)

(72) Inventors: Paul Edward Durkee, Centerton, AR (US); Bradley Johnson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/545,149

(22) Filed: Dec. 19, 2023

(65) Prior Publication Data

US 2024/0116713 A1   Apr. 11, 2024

Related U.S. Application Data

(63) Continuation of application No. 17/570,687, filed on Jan. 7, 2022, now abandoned, which is a continuation of application No. 16/507,998, filed on Jul. 10, 2019, now abandoned.

(60) Provisional application No. 62/697,238, filed on Jul. 12, 2018.

(51) Int. Cl.
*G06F 7/00* (2006.01)
*B65G 1/04* (2006.01)
*B65G 1/137* (2006.01)
*G06K 7/14* (2006.01)

(52) U.S. Cl.
CPC .......... *B65G 1/1371* (2013.01); *B65G 1/045* (2013.01); *B65G 1/1373* (2013.01); *G06K 7/1413* (2013.01)

(58) Field of Classification Search
CPC .... B65G 1/1371; B65G 1/045; B65G 1/1373; G06K 7/1413; G07F 11/04; G07F 11/32; G07F 17/10; G07F 11/02; G07F 11/30; G07F 17/12
USPC ................................. 700/213–216, 231–232
See application file for complete search history.

(56) References Cited

U.S. PATENT DOCUMENTS

| | | |
|---|---|---|
| 3,737,057 A | 6/1973 | Neumann |
| 5,065,872 A | 11/1991 | Simon |
| 5,337,920 A | 8/1994 | Clausen |
| 5,478,182 A | 12/1995 | Hildebrand |
| 5,568,393 A | 10/1996 | Ando |
| 5,593,269 A | 1/1997 | Bernard, II |
| 5,674,040 A | 10/1997 | Wagner |
| 6,224,313 B1 | 5/2001 | Fukushima |
| 6,325,775 B1 | 12/2001 | Thom |
| 6,409,449 B1 | 6/2002 | Freudelsperger |

(Continued)

FOREIGN PATENT DOCUMENTS

| | | |
|---|---|---|
| CN | 106942915 A | 7/2017 |
| CN | 107346590 | 11/2017 |

(Continued)

OTHER PUBLICATIONS

U.S. Appl. No. 18/545,141, filed Dec. 19, 2023, Durkee Paul Edward.

(Continued)

*Primary Examiner* — Yolanda R Cumbess
(74) *Attorney, Agent, or Firm* — Fitch, Even, Tabin & Flannery, LLP (57) ABSTRACT

An autonomous storage and retrieval tower for receiving, storing, and dispensing free physical products.

20 Claims, 5 Drawing Sheets

(56) References Cited

U.S. PATENT DOCUMENTS

| | | |
|---|---|---|
| 6,416,270 B1 | 7/2002 | Steury |
| 6,443,317 B1 | 9/2002 | Brozak, Jr. |
| 6,598,829 B2 | 7/2003 | Kamstra |
| 6,694,217 B2 | 2/2004 | Bloom |
| 6,783,058 B2 | 8/2004 | Quaintance |
| 6,845,873 B1 | 1/2005 | Chattey |
| 6,882,269 B2 | 4/2005 | Moreno |
| 7,010,501 B1 | 3/2006 | Roslak |
| 7,013,198 B2 | 3/2006 | Haas |
| 7,086,558 B1 | 8/2006 | Pixley |
| 7,106,202 B2 | 9/2006 | Dickinson |
| 7,324,921 B2 | 1/2008 | Sugahara |
| 7,360,042 B2 | 4/2008 | Chen |
| 7,870,029 B2 | 1/2011 | Bates |
| 8,145,351 B2 | 3/2012 | Schininger |
| 8,364,520 B1 * | 1/2013 | Eichorn ............. G06Q 30/0246 705/7.31 |
| 8,502,644 B1 | 8/2013 | Newman |
| 8,560,406 B1 | 10/2013 | Antony |
| 8,755,930 B2 | 6/2014 | Miller |
| 8,882,432 B2 | 11/2014 | Bastianii |
| 8,920,098 B2 | 12/2014 | Joachim |
| 9,052,992 B2 | 6/2015 | Irwin |
| 9,082,247 B2 | 7/2015 | Turner |
| 9,120,524 B2 | 9/2015 | Ozaki |
| 9,120,624 B1 | 9/2015 | Cassady |
| 9,230,230 B2 | 1/2016 | Gupta |
| 9,242,810 B2 | 1/2016 | Remi |
| 9,443,372 B2 | 9/2016 | Mockus |
| 9,482,522 B2 | 11/2016 | Motoyama |
| 9,516,974 B2 | 12/2016 | Herling |
| 9,517,296 B2 | 12/2016 | Fulkerson |
| 9,604,259 B2 | 3/2017 | Lossov |
| 9,646,280 B2 | 5/2017 | Thomas |
| 9,821,960 B2 | 11/2017 | Issing |
| 9,830,572 B2 | 11/2017 | Wan |
| 9,984,520 B1 | 5/2018 | Heller |
| 10,019,593 B1 | 7/2018 | Patel |
| 10,019,693 B2 | 7/2018 | Wolf |
| 10,043,151 B1 | 8/2018 | Zhu |
| 10,114,996 B2 | 10/2018 | Lossov |
| 10,187,542 B1 | 1/2019 | Fielding |
| 10,303,133 B1 | 5/2019 | Dhalla |
| 10,357,804 B2 | 7/2019 | Must |
| 10,621,401 B2 | 4/2020 | Lossov |
| 11,397,910 B2 | 7/2022 | Durkee |
| 11,893,530 B2 | 2/2024 | Durkee |
| 2002/0032501 A1 | 3/2002 | Tilles |
| 2002/0035515 A1 | 3/2002 | Moreno |
| 2002/0165787 A1 | 11/2002 | Bates |
| 2003/0038097 A1 | 2/2003 | Palder |
| 2003/0046166 A1 | 3/2003 | Liebman |
| 2003/0065421 A1 | 4/2003 | Didriksen |
| 2003/0065898 A1 | 4/2003 | Flamma |
| 2003/0093333 A1 | 5/2003 | Veeneman |
| 2004/0037680 A1 | 2/2004 | Sato |
| 2004/0069572 A1 | 4/2004 | Jaspers |
| 2004/0175258 A1 | 9/2004 | Haas |
| 2004/0238326 A1 | 12/2004 | Lichti |
| 2004/0260665 A1 | 12/2004 | Hamilton |
| 2005/0000974 A1 | 1/2005 | Chirnomas |
| 2005/0021173 A1 | 1/2005 | Pinney |
| 2005/0038712 A1 | 2/2005 | Veeneman |
| 2005/0053450 A1 | 3/2005 | Kantola |
| 2005/0211768 A1 | 9/2005 | Stillman |
| 2006/0045660 A1 | 3/2006 | Di Rosa |
| 2006/0293956 A1 * | 12/2006 | Walker ............... G06Q 30/0269 705/14.15 |
| 2007/0025830 A1 | 2/2007 | Solomon |
| 2007/0032903 A1 | 2/2007 | Tsujimoto |
| 2007/0150375 A1 | 6/2007 | Yang |
| 2007/0187183 A1 | 8/2007 | Saigh |
| 2007/0284442 A1 | 12/2007 | Herskovitz |
| 2007/0293978 A1 | 12/2007 | Wurman |
| 2008/0135574 A1 | 6/2008 | Hieb |
| 2008/0260504 A1 | 10/2008 | Gifford |
| 2009/0211962 A1 | 8/2009 | Min |
| 2010/0076591 A1 | 3/2010 | Lert, Jr. |
| 2010/0138037 A1 | 6/2010 | Adelberg |
| 2010/0253190 A1 | 10/2010 | Li |
| 2011/0178633 A1 | 7/2011 | Marrese |
| 2012/0024160 A1 | 2/2012 | Van Os |
| 2012/0027547 A1 | 2/2012 | Erich |
| 2012/0123587 A1 | 5/2012 | Mockus |
| 2012/0303154 A1 | 11/2012 | Stiernagle |
| 2013/0092700 A1 | 4/2013 | Braunstein |
| 2013/0131863 A1 | 5/2013 | Hoersten |
| 2013/0167311 A1 | 7/2013 | Johnson |
| 2013/0184854 A1 | 7/2013 | Bastian, II |
| 2013/0238115 A1 | 9/2013 | Smith |
| 2014/0021253 A1 | 1/2014 | Carson |
| 2014/0037404 A1 | 2/2014 | Hancock |
| 2014/0079518 A1 | 3/2014 | Qi |
| 2014/0089085 A1 | 3/2014 | Mueller |
| 2014/0100942 A1 | 4/2014 | Konevic |
| 2014/0190914 A1 | 7/2014 | Nagel |
| 2014/0278603 A1 | 9/2014 | Lievens |
| 2014/0316916 A1 | 10/2014 | Hay |
| 2014/0330603 A1 | 11/2014 | Corder |
| 2015/0032252 A1 | 1/2015 | Galluzzo |
| 2015/0034713 A1 | 2/2015 | Jones |
| 2015/0088307 A1 | 3/2015 | Ackerman |
| 2015/0088731 A1 | 3/2015 | Ackerman |
| 2015/0106291 A1 | 4/2015 | Robinson |
| 2015/0106295 A1 | 4/2015 | Robinson |
| 2015/0106296 A1 | 4/2015 | Robinson |
| 2015/0120094 A1 | 4/2015 | Kimchi |
| 2015/0120602 A1 | 4/2015 | Huffman |
| 2015/0158679 A1 | 6/2015 | Remi |
| 2015/0186840 A1 | 7/2015 | Torres |
| 2015/0265124 A1 | 9/2015 | Chen |
| 2015/0266672 A1 | 9/2015 | Lert |
| 2015/0310694 A1 | 10/2015 | Will |
| 2015/0339625 A1 | 11/2015 | Agasti |
| 2015/0343494 A1 | 12/2015 | Lossov |
| 2015/0356664 A1 | 12/2015 | Mackler |
| 2015/0371187 A1 | 12/2015 | Irwin |
| 2015/0379464 A1 | 12/2015 | Turner |
| 2015/0379554 A1 | 12/2015 | Copeland |
| 2016/0125508 A1 | 5/2016 | Carr |
| 2016/0130086 A1 | 5/2016 | Yamashita |
| 2016/0194152 A1 | 7/2016 | Lo Iacono |
| 2016/0229633 A1 | 8/2016 | Yamashita |
| 2016/0236865 A1 | 8/2016 | Altemir |
| 2016/0247702 A1 | 8/2016 | Adachi |
| 2016/0327941 A1 | 11/2016 | Stiernagle |
| 2017/0010609 A1 | 1/2017 | High |
| 2017/0073159 A1 | 3/2017 | Lossov |
| 2017/0088355 A1 | 3/2017 | Khodl |
| 2017/0091704 A1 | 3/2017 | Wolf |
| 2017/0091710 A1 | 3/2017 | Van Dyke |
| 2017/0124547 A1 | 5/2017 | Natarajan |
| 2017/0147975 A1 | 5/2017 | Natarajan |
| 2017/0200117 A1 | 7/2017 | High |
| 2017/0323250 A1 | 11/2017 | Lindbo |
| 2018/0014438 A1 | 1/2018 | Bilato |
| 2018/0041493 A1 | 2/2018 | Wilkinson |
| 2018/0060800 A1 | 3/2018 | Robinson |
| 2018/0060812 A1 | 3/2018 | Robinson |
| 2018/0068139 A1 | 3/2018 | Aalund |
| 2018/0089619 A1 | 3/2018 | High |
| 2018/0121872 A1 | 5/2018 | Walsh |
| 2018/0121873 A1 | 5/2018 | Walsh |
| 2018/0130017 A1 | 5/2018 | Gupte |
| 2018/0135337 A1 | 5/2018 | Johnson |
| 2018/0144296 A1 | 5/2018 | Engel |
| 2018/0172799 A1 | 6/2018 | Meadow |
| 2018/0174101 A1 | 6/2018 | Mattingly |
| 2018/0177318 A1 | 6/2018 | Chambers |
| 2018/0186454 A1 | 7/2018 | Luckay |
| 2018/0190062 A1 | 7/2018 | Robinson |
| 2018/0244469 A1 | 8/2018 | Testa |
| 2018/0251302 A1 | 9/2018 | Valinsky |
| 2018/0253687 A1 * | 9/2018 | Bornitz ................. G06Q 10/08 |

(56) References Cited

U.S. PATENT DOCUMENTS

| | | |
|---|---|---|
| 2018/0300679 A1 | 10/2018 | Mahmood |
| 2018/0305125 A1 | 10/2018 | Guo |
| 2018/0365641 A1 | 12/2018 | Zhu |
| 2019/0012639 A1 | 1/2019 | Boothman |
| 2019/0024302 A1 | 1/2019 | Jang |
| 2019/0031441 A1 | 1/2019 | Jin |
| 2019/0112119 A1 | 4/2019 | Alexander |
| 2019/0114585 A1 | 4/2019 | Fee |
| 2019/0114859 A1 | 4/2019 | Fee |
| 2019/0147397 A1 | 5/2019 | Hodges |
| 2019/0188936 A1 | 6/2019 | Sivill |
| 2019/0213540 A1 | 7/2019 | Petroski |
| 2019/0220815 A1 | 7/2019 | Nelson |
| 2019/0313828 A1 | 10/2019 | Schmider |
| 2019/0337719 A1 | 11/2019 | Tovey |
| 2019/0344965 A1 | 11/2019 | Wilkinson |
| 2019/0352095 A1 | 11/2019 | Tovey |
| 2019/0370744 A1 | 12/2019 | Fee |
| 2019/0375594 A1 | 12/2019 | Tovey |
| 2020/0002093 A1 | 1/2020 | Tovey |
| 2020/0005226 A1 | 1/2020 | Sikka |
| 2020/0012245 A1 | 1/2020 | Marin Pulido |
| 2020/0017298 A1 | 1/2020 | Durkee |
| 2020/0017299 A1 | 1/2020 | Durkee |
| 2020/0017300 A1 | 1/2020 | Durkee |
| 2020/0019929 A1 | 1/2020 | Chaney |
| 2020/0172337 A1 | 6/2020 | Wilkinson |
| 2020/0193373 A1 | 6/2020 | Varman |
| 2020/0226539 A1 | 7/2020 | Durkee |
| 2020/0239229 A1 | 7/2020 | Tovey |
| 2020/0250614 A1 | 8/2020 | Zhu |
| 2020/0250615 A1 | 8/2020 | Fee |
| 2020/0293990 A1 | 9/2020 | Mak |
| 2020/0317446 A1 | 10/2020 | Tovey |
| 2020/0394375 A1 | 12/2020 | Lõssov |
| 2021/0074100 A1 | 3/2021 | Kashi |
| 2021/0142277 A1 | 5/2021 | Fee |
| 2022/0127078 A1 | 4/2022 | Durkee |
| 2022/0250840 A1 | 8/2022 | Wilkinson |
| 2022/0306385 A1 | 9/2022 | Tovey |
| 2022/0309456 A1 | 9/2022 | Durkee |
| 2023/0394425 A1 | 12/2023 | Chaney |

FOREIGN PATENT DOCUMENTS

| | | |
|---|---|---|
| CN | 107454863 | 12/2017 |
| CN | 107814122 | 3/2018 |
| DE | 4339056 | 5/1995 |
| EM | 0021045470001 | 9/2012 |
| EM | 0027572450001 | 8/2015 |
| EM | 0027572450002 | 8/2015 |
| EM | 0027572450003 | 8/2015 |
| EM | 0036406890001 | 1/2017 |
| EM | 0037930660001 | 3/2017 |
| EM | 0034029650001 | 7/2017 |
| EM | 0041697610001 | 8/2017 |
| EP | 2881905 | 6/2015 |
| EP | 2950282 | 12/2015 |
| EP | 3142085 | 3/2017 |
| EP | 3255596 | 12/2017 |
| GB | 2175575 A | 12/1986 |
| GB | 2409748 | 7/2005 |
| GB | 2430608 | 4/2007 |
| GB | 2430705 | 4/2007 |
| GB | 2437967 | 11/2007 |
| GB | 2491340 | 12/2012 |
| GB | 2564313 | 1/2019 |
| GB | 2590246 | 6/2021 |
| GB | 2590248 | 6/2021 |
| GB | 2590267 | 6/2021 |
| GB | 2590268 | 6/2021 |
| JP | 2017048014 A | 3/2017 |
| WO | 1995011829 | 5/1995 |
| WO | 1998007641 | 2/1998 |
| WO | 2001018395 | 3/2001 |
| WO | 2001097101 | 12/2001 |
| WO | 2002007021 | 1/2002 |
| WO | 2002074634 | 9/2002 |
| WO | 2003046782 | 6/2003 |
| WO | 2006136108 A1 | 12/2006 |
| WO | 2008104731 | 9/2008 |
| WO | 2015019377 | 2/2015 |
| WO | 2015037923 A1 | 3/2015 |
| WO | 2015044692 | 4/2015 |
| WO | 2016176464 A1 | 11/2016 |
| WO | 2017081550 | 5/2017 |
| WO | 2017163018 | 9/2017 |
| WO | 2019212853 | 11/2019 |
| WO | 2019222246 | 11/2019 |
| WO | 2020014373 | 1/2020 |
| WO | 2020014374 | 1/2020 |
| WO | 2020014608 | 1/2020 |
| WO | 2020014615 | 1/2020 |
| WO | 2020092790 | 5/2020 |
| WO | 2020118227 | 6/2020 |

OTHER PUBLICATIONS

Agarwal, VIvek, Report: Assessing the benefits of Auto-ID Technology in the Consumer Goods Industry, Cambridge University Auto ID center, University of Cambridge. (Year: 2001).

Benofficial, Walmart's new Cleveron Pickup Machine in action, 3p, Dec. 21, 2017, Youtube, https://www.youtube.com/watch?v=c6amWJISqHO, retrieved Jul. 8, 2020.

Benofficial; "Walmart's new Cleveron pickup machine in action"; <youtube.com>; Dec. 21, 2017; pp. 1-5.

Boeing Invests in Matternet, Matternet, https://mttr.net/, Jun. 26, 2018, 4 pages.

Channel 8 KLKN-TV, Walmart unveils pick up tower, published Jun. 29, 2018, retrieved from <https://www.youtube.com/watch?v=P8HOrzxT6yE> on Jul. 8, 2020, 2 pages.

Click and collect pickup automation for retail and logistics, Cleveron, https://cleveron.eu/, 2018, 5 pages.

Cleveron as Automated Parcel Machine PackRobot With Smart Storage System. Product Sheet www.cleveron.eu/packrobot. retrieved from web.archive.org/web/20160910094527/http://www.cleveron.eu/packrobot#videosection. Published at least as early as Sep. 10, 2016, 3 pages.

Cleveron as, Cleveron 10, published Nov. 15, 2017, retrieved from <https://www.youtube.com/watch?v=gz3WrYa1Zbs> on Jul. 8, 2020, 4 pages.

Cleveron as, Cleveron highlights the lack of drone delivery legislation at Digital Summit Tallinn, Sep. 26, 2017 https://cleveron.com/news/cleveron-digital-summit; 3p.

Cleveron as, Cleveron Introduction 2016. published Jun. 14, 2016, retrieved from https://www.youtube.com/watch?v=ly4K_yWCXRg on Jul. 8, 2020, 4 pages.

Cleveron as, Courier loading operations at Cleveron's Parcel Terminal, published Nov. 6, 2012, retrieved from <https://www.youtube.com/watch?v=qgQ0f-bTQ10> on Jul. 8, 2020, 2 pages.

Cleveron as, Multiload system of Cleveron's PackRobot, published Sep. 26, 2012, retrieved from <https://www.youtube.com/watch?v=l31M3V-8saE> on Jul. 8, 2020, 2 pages.

Cleveron as, Pack robot Cleveron 401, 5p, Sep. 15, 2015, You-tube, https://www.youtube.com/watch?v=-iyT2hGrF0c, retrieved Jul. 8, 2020.

Cleveron as, Pack robot Cleveron 401, published Sep. 15, 2015, retrieved from <https://www.youtube.com/watch?v=-iyT2hGrF0c> on Jul. 8, 2020, 2 pages.

Cleveron as, Smart Post Etv Feb. 28, 2010, published Mar. 16, 2010, retrieved from <https://www.youtube.com/watch?v=K-hNRJGZKEY> on Jul. 8, 2020, 2 pages.

Cleveron as; SmartPost ETV Feb. 28, 2010 Mar. 16, 2010, screenshots 2:25, 2:26, 2:35 2p. https://youtu.be/K-hNRJGZKEY, 2 pages.

Cleveron, Automated parcel Machine PackRobot with smart storage system. Product sheet. Published at least as early as Sep. 20, 2016 at www.cleveron.eu/packrobot; and at https://issuu.com/cleveron/docs/pr16002_1_tooteleht on Apr. 10, 2017, 4 pages.

(56) References Cited

OTHER PUBLICATIONS

Drew Menard, "New high-tech book retrieval system enhances library resources", Jul. 19, 2013, liberty.edu, 6 pages (Year: 2013).
Hointer, the Hointer Experience. Retrieved online at: https://www.youtube.com/watch?v=i9348H-mw4. 2 pages, Mar. 21, 2014.
Intelligent, Intuitive and Interconnected Vending Machings, SAP Blogs, https://blogs.sap.com/2015/04/16/intelligent-intuitive-and-interconnected-vending-machines/, Apr. 16, 2015, 7 pages.
International Search Report and Written Opinion for Application No. PCT/US2019/041222, dated Oct. 9, 2019, 12 pages.
K. L. Choy G. T. S. Ho . C. K. H. Lee, A RFID-based storage assignment system for enhancing the efficiency of order picking, Published online: Sep. 19, 2014, J Intell Manuf (2017) 28:111-129 (Year: 2014).
Nicole Dube, "E-Cigarettes and Minors", Jan. 19, 2018, cga.ct.gov, 4 pages, (Year: 2018).
PackRobot: robotics based most efficient parcel terminal, Cleveron, http://cleveron.eu/packrobot/#1490003126030-5c15306f-a9f0, 2017, 9 pages.
Palm, Zara tests out a new kiosk designed to hold packages for customers who make online orders. Retrieved online at: https://www.psfk.com/2018/01/zara-self-service-kiosks-online-orders.html. 6 pages, Jan. 2, 2018.
Peterson, Hayley, Walmart is unleashing 2 key weapons against Amazon in 700 stores. Apr. 5, 11, 2018, 11 pages. https://www.businessinsider.com/walmart-online-pickup-tower-review-2017-8.
Peterson, Walmart is building giant towers to solve the most annoying thing about online ordering. Business insider. Retrieved online at: https://www.businessinsider.in. 8 pages, Jul. 5, 2017.
Pipatprapa, Anirut, "QR Code on Mobile Platform for Improving Order Picking Process of Lean Factory Warehouse," 2019, International Journal of Innovation, Management and Technology 10.1 (2019): 56-60. (Year: 2019).
Simplifying Cloud-Connected Vending Machines, Intelligent Vending with Intel® IoT Retail Gateway, https://www.intel.in/content/www/in/en/embedded/retail/vending/iot-gateway-for-intelligent-vending/overview.html, last viewed Aug. 16, 2018, 4 pages.
Smolnikov, Teleitems Robotic Parcel Terminal Promo, https://www.youtube.com/watch?v=mXL_c50T9Rc, published Jul. 21, 2017, 1 page.
Technology Breaking News, Walmart adds 500 Pickup Towers to its stores across the US, published Apr. 27, 2018, retrieved from <https://www.youtube.com/watch?v=wbrw9BEIqrY> on Jul. 8, 2020, 2 pages.
U.S. Appl. No. 16/507,998; Notice of Allowance mailed Jun. 21, 2021; (10 pages).
U.S. Appl. No. 16/507,998; Notice of Allowance mailed Oct. 12, 2021; (5 pages).
U.S. Appl. No. 17/570,687; Ex Parte Quayle Action mailed Aug. 16, 2023; (pp. 1-5).
U.S. Appl. No. 17/570,687; Notice of Allowance and Fees Due (PTOL-85) mailed Oct. 24, 2023; (pp. 1-8).
Vidmar, Stanley, Tower System provides automated storage and retrieval., Mar. 30, 2005, https://news.thomasnet.com/fullstory/tower-system-provides-automated-storage-and-retrieval-461698 (Year: 2005), 5 pages.
Zdnet, Walmart rolls out 500 more vending machines for online order pickups | ZDNet, published Jun. 3, 2018, retrieved from <https://www.youtube.com/watch?v=WtSnq9_CExY> on Jul. 8, 2020, 2 pages.

* cited by examiner

AUTONOMOUS STORAGE AND RETRIEVAL TOWER

CROSS-REFERENCE TO RELATED PATENT APPLICATIONS

This application application is a continuation of U.S. application Ser. No. 17/570,687, filed Jan. 7, 2022, which is a continuation of U.S. application Ser. No. 16/507,998, filed Jul. 10, 2019, now abandoned, which claims priority to U.S. application Ser. No. 62/697,238, filed on Jul. 12, 2018, the content of each of which is hereby incorporated by reference in its entirety.

BACKGROUND

Storage and retrieval towers, also known as automated kiosks or pickup towers, are used in some retail facilities to enable customers to retrieve items from the pickup towers.

BRIEF DESCRIPTION OF THE DRAWINGS

The accompanying drawings, which are incorporated in and constitute a part of this specification, illustrate one or more embodiments of the disclosure and, together with the description, help to explain the disclosure. The drawings are not necessarily to scale, or inclusive of all elements of a system, emphasis instead generally being placed upon illustrating the concepts, structures, and techniques sought to be protected herein. In the drawings.

DETAILED DESCRIPTION

Exemplary embodiments provide an autonomous storage and retrieval tower used to receive, store, and dispense physical items, including free physical items. A customer may order physical items online and select the "pick-up" option at checkout. When the ordered physical items arrive at a store local to the customer, a store associate may load the ordered physical items into the autonomous storage and retrieval tower. When the customer arrives at the store, the customer can proceed to the autonomous storage and retrieval tower and enter or scan a code associated with the order. The customer may then promptly receive the ordered physical items from the autonomous storage and retrieval tower.

The autonomous storage and retrieval tower includes a housing and shelves within the housing. Each shelf is configured to support one or more physical items. The tower further includes a storage receptacle for receiving physical items to be stored by the autonomous storage and retrieval tower and/or for outputting physical items from the autonomous storage and retrieval tower. The autonomous storage and retrieval tower includes and/or is in communication with an application programming interface (API). The API is in communication with a fulfillment server and enables the fulfillment server to interact with the autonomous storage and retrieval tower for tracking physical items within the autonomous storage and retrieval tower. The fulfillment server is part of a fulfillment system used to receive and fulfill customer orders, such as orders submitted online. Orders are received through the fulfillment system, including orders being shipped into a store for pick-up by a customer. The orders may include information, such as an image, a price, an order number, a universal item code (UPC), and a deadline.

The autonomous storage and retrieval tower includes an input device for receiving input, such as a code, from a user when storing a physical item in the autonomous storage and retrieval tower. The input device may be a keyboard or a scanner. The input is entered into the input device to identify the physical item being entered into the autonomous storage and retrieval tower. The input is received by a controller that controls receiving and storing the physical item within the autonomous storage and retrieval tower. The controller further communicates with the fulfillment server regarding a location of the physical item stored within the autonomous storage and retrieval tower.

In some embodiments, the input is an alphabetical code, a numerical code, or an alpha-numerical code. In further embodiments, the code may be encoded in a machine readable identifier such as a bar code, a Radio Frequency Identification (RFID) tag, or other type of machine readable codes. For example, the code may be encoded as a barcode that, for example, may be rendered on paper or on a mobile device that the user can scan at the scanner.

In some embodiments, when storing a free physical item in the autonomous storage and retrieval tower, a code that includes a specified identifier is entered into the input device to identify the physical item as a free physical item. For example, the user may enter or scan a code that starts with a specified character or characters, such as, for example, "G" for gift. The free physical item is not associated with an order. In a normal operating mode, scanning a UPC or other identifier associated with a physical item when the physical item is being inserted into the tower for storage causes the controller associated with the tower to communicate with the fulfillment system via the API. However, entering the code causes the controller within the autonomous storage and retrieval tower to implement an exception operating mode in which the controller disables and/or does not engage the API. In some instances, if the code was input to the API, the code may cause an error in the API or otherwise may not be recognized by the API. The autonomous storage and retrieval tower then receives the physical item on a tray and stores the physical item on a shelf within the autonomous storage and retrieval tower without communicating with the fulfillment system via the API. The controller enters a location of the physical item into a database within the autonomous storage and retrieval tower. Once the item is stored within the autonomous storage and retrieval tower, the controller reactivates or re-engages the API.

In an illustrative example, the controller receives an input from the input device, where the input is associated with a free gift that will be provided to a customer using the autonomous storage and retrieval tower to pick-up an order. The controller analyzes the input for a specified identifier, where the specified identifier is associated with storing a free physical item, such as a gift, that is not associated with an order. In some embodiments, the specified identifier is one or more letters or one or more numbers included within the code. The controller identifies the specified identifier in the input as an identifier associated with a free physical item. Accordingly, the controller disables or does not engage the API. The disabling or disengaging of the API prevents the autonomous storage and retrieval tower from communicating with the fulfillment server. The controller instructs the storing of the free physical item associated with the input, wherein the physical item is placed on a tray in the storage receptacle and transported to a shelf within the tower. The controller further enters a location (e.g., a container number and a shelf number) of the physical item within the autonomous storage and retrieval tower into the database. After the free physical item is stored with the autonomous storage and retrieval tower, the controller enables or re-engages the API.

In some embodiment, upon storing the physical item in the autonomous storage and retrieval tower, the controller transmits a notification, such as an e-mail or text message, to a customer that includes the code. The customer can enter or scan the code at the autonomous storage and retrieval tower to retrieve the physical item for free. The tower recognizes the code as a free or promotional item code, thereupon the API is deactivated and/or is not engaged, and the physical item is dispensed as a gift, as described above.

The input device may also be used to receive an input from a user for retrieving a physical item from the autonomous storage and retrieval tower. In an exemplary embodiment, when retrieving a free physical item in the autonomous storage and retrieval tower, the controller receives the input from the input device. In some embodiments, the input used to store the free physical item in the autonomous storage and retrieval tower may be different from the input used to retrieve the free physical item from the autonomous storage and retrieval tower. The controller analyzes the input that includes the specified identifier associated with the free physical item. Upon identifying the specified identifier in the input, the controller disables and/or does not engage the API. The disabling or disengaging of the API prevents the autonomous storage and retrieval tower from communicating with the fulfillment server. The controller instructs retrieval of the free physical item associated with the input. The free physical item is transported from its storage location to the storage receptacle. Once the free physical item is dispensed from the storage receptacle, the controller enables or re-engages the API.

In some embodiments, the autonomous storage and retrieval tower may include a user interface that displays database information associated with the free physical items, such as types of free physical items, locations of the free physical items, how many trays are used for the free physical items, etc. Once a free physical item is dispensed, the database may be updated but the information associated with the free physical product is typically not used for other purposes.

Figure 1:
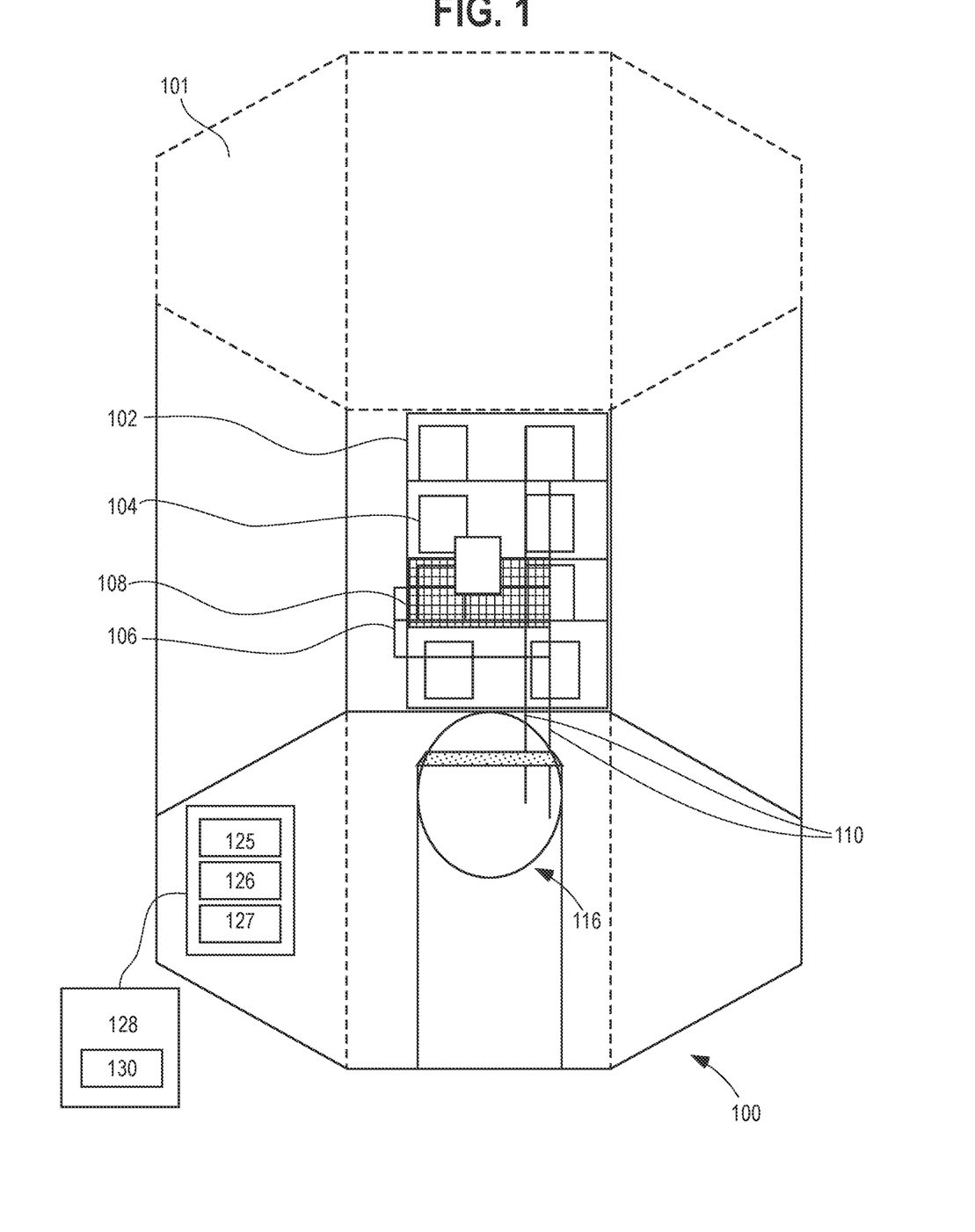
FIG. 1 is a schematic diagram of an interior view of an autonomous storage and retrieval tower in accordance with an example embodiment.

FIG. 1 is a schematic diagram of an interior view of an autonomous storage and retrieval tower 100 (referred to as storage tower 100) in accordance with an exemplary embodiment. The storage tower 100 may be physically located at the front area of a store and used for storing orders for customer pickup. For example, the customer may arrive at a receiving and/or delivery opening 116 and present proof of purchase (e.g., a code) to an input device, and the item is dispensed from the storage tower 100 to the customer.

The storage tower 100 can include a housing 101. The housing 101 can include, for example, eight interior walls. In some embodiments, the housing can have an octagonal column or octagonal cylinder shape. The interior of the storage tower 100 can include a shelving unit 102, physical items 104 disposed in or on containers 108 on the shelving unit 102, a robotic crane 106, a boom or shaft 110, a rotating base 112, and at least one receiving and/or delivery opening 116 (e.g., a storage receptacle). Containers 108 may be received at the autonomous storage and retrieval tower 100 via a variety of mechanisms such as, but not limited to, a conveyor belt delivering the containers to or through the opening 116. Containers 108 may be inserted into the storage tower 100 or dispensed from the storage tower 100 through the opening 116. The shelving unit 102 can include shelves configured to store and support containers holding physical items 104. The shelving unit 102 can be disposed along one or each of the interior walls of the storage tower 100. The shaft 110 can extend vertically within the housing 101 in a cavity surrounded by the shelves. In some embodiments, the shaft 110 can extend along a central axis of the housing. The robotic crane 106 can extend perpendicularly from the shaft 110. The robotic crane 106 is configured to traverse the shaft 110 to store and retrieve containers 108 on the shelving unit 102. The rotating base 112 can be configured to rotate the shaft 110, 360 degrees, around the interior of the storage tower 100 so that the shaft 112 is perpendicular to the appropriate shelving unit 102 containing a physical item 104. The robotic crane 106 can move up and down vertically along the shaft 110 to align itself with the shelf on which a physical item 104 is disposed. The robotic crane 106 can receive instructions from a controller 125 to load a physical item 104 from the shelving unit 102 (or its container) onto the robotic crane 106 and transport the physical item 104 to the opening 116 or to retrieve a physical item 104 from the opening 116 to load the physical item 104 onto a shelving unit 102 for storage in the storage tower 100.

In an exemplary embodiment, the storage tower 100 includes and/or is in communication with an application programming interface (API) 126. The API 126 is in communication with a fulfillment server 128 and enables the fulfillment server 128 to interact with the storage tower 100 for tracking physical items within the storage tower 100. The fulfillment server 128 may also include an API 130 that can interact with the storage tower 100. The storage tower 100 may further includes a database 127 for storing data and locations associated with physical items stored within the storage tower 100.

Figure 2:
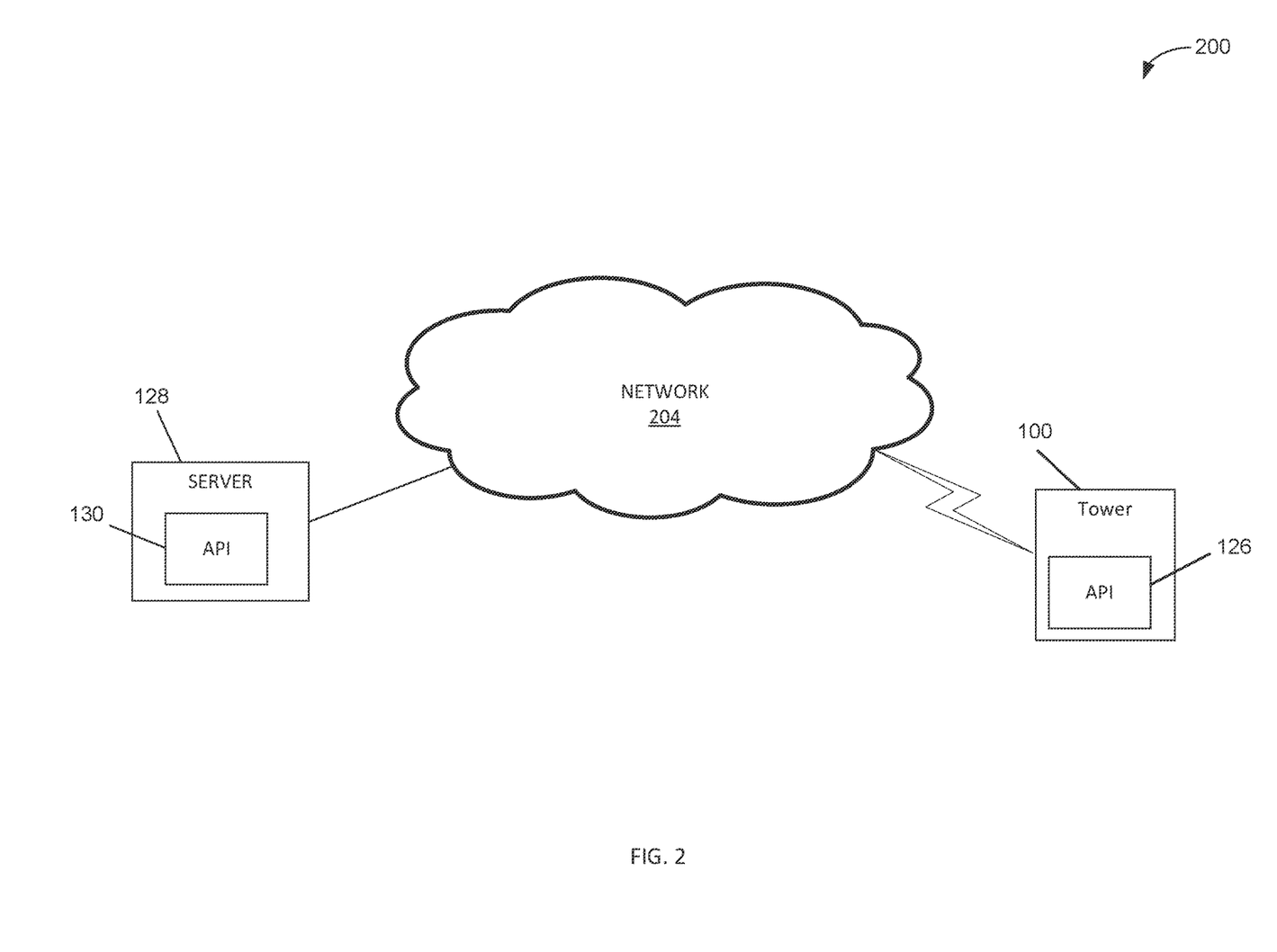
FIG. 2 illustrates a network diagram depicting a system for implementing the autonomous storage and retrieval tower in accordance with an example embodiment.

FIG. 2 illustrates a network diagram depicting a system 200 for implementing the autonomous storage and retrieval tower 100, according to an example embodiment. The system 200 can include the autonomous storage and retrieval tower 100, a network 204, and the fulfillment server 128. Each of the autonomous storage and retrieval tower 100 and the server 128 is in communication with the network 204 and may connect to network 204 via a wired or wireless connection. The server 128 comprises one or more computers or processors configured to communicate with the autonomous storage and retrieval tower 100 via network 204. The server 128 can include one or more components of device 300 of FIG. 3.

In an example embodiment, one or more portions of network 204 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Server 128 hosts one or more software systems, applications or websites, including one or more components of the fulfillment system described herein. In an example embodiment, the server 128 also includes various software services that facilitate the functionalities of the fulfillment system. The fulfillment system is used to receive and fulfill orders, such as orders submitted online. Orders being shipped into a store are received through the fulfillment system. The orders may include information, such as an image, a price, an order number, a universal item code (UPC), and a deadline.

The autonomous storage and retrieval tower 100 includes and/or is in communication with the application programming interface (API) 126, which can be in communication with a fulfillment server 128 and can enable the fulfillment server 128 to interact with the storage tower 100 for tracking physical items within the storage tower 100 when the storage tower is operating in a normal mode of operation. The fulfillment server 128 may also include the API 130 that can interact with the storage tower 100.

Figure 3:
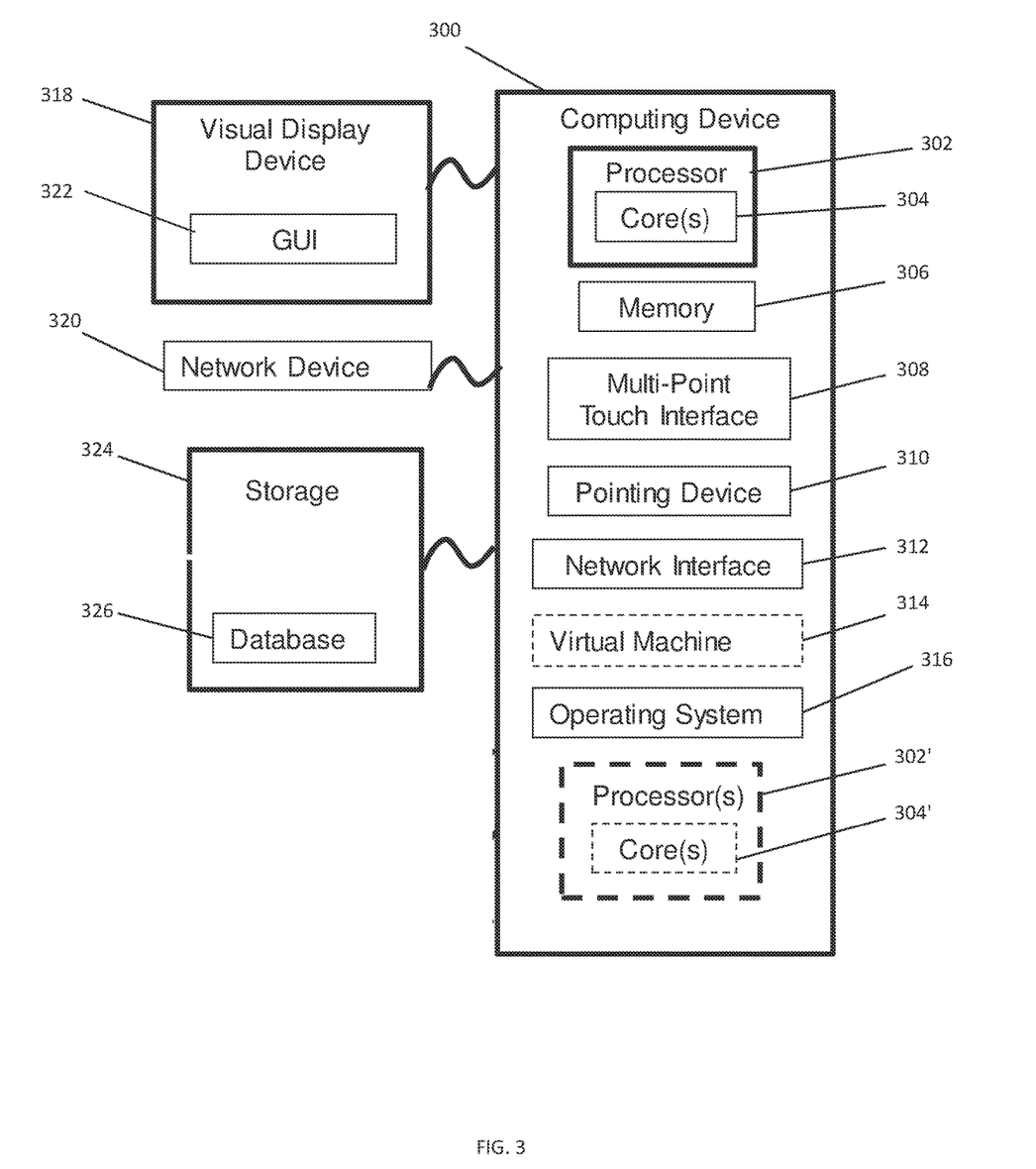
FIG. 3 is a block diagram of an exemplary computing device that may be used to implement exemplary embodiments described herein.

FIG. 3 is a block diagram of an exemplary computing device 300 that can be used to perform one or more steps of the methods provided by exemplary embodiments. For example, computing device 300 may be the fulfillment server 128 or included within autonomous storage and retrieval tower 100. The computing device 300 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 306 included in the computing device 300 can store computer-readable and computer-executable instructions or software for implementing exemplary embodiments. The computing device 300 also includes processor 302 and associated core 304, and optionally, one or more additional processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' can each be a single core processor or multiple core (304 and 304') processor.

Virtualization can be employed in the computing device 300 so that infrastructure and resources in the computing device can be shared dynamically. A virtual machine 314 can be provided to handle a process running on multiple processors so that the process appears to be using only one computing resource rather than multiple computing resources. Multiple virtual machines can also be used with one processor.

Memory 306 can include a computer system memory or random access memory, such as DRAM, SRAM, EDO RAM, and the like. Memory 306 can include other types of memory as well, or combinations thereof. An individual can interact with the computing device 300 through a visual display device 318, such as a touch screen display or computer monitor, which can display, via a graphical user interface 322, one or more user interfaces 319 for receiving data from the individual (e.g., an input for ordered physical items or free physical items). In some embodiments, the visual display device 318 can act as an input device. The visual display device 318 can also display other aspects, elements and/or information or data associated with exemplary embodiments. The computing device 300 can include other I/O devices for receiving input from a individual, for example, a keyboard or another suitable multi-point touch interface 308, a pointing device 310 (e.g., a pen, stylus, mouse, or trackpad). The multi-point touch interface 308 and the pointing device 310 can be coupled to the visual display device 318. The computing device 300 can include other suitable conventional I/O peripherals.

The computing device 300 can also include one or more storage devices 324, such as a hard-drive, CD-ROM, or other computer readable media, for storing data and computer-readable instructions and/or software, that implements exemplary embodiments of the system as described herein (e.g., the fulfillment system, API 130), or portions thereof, which can be executed to generate user interface 319 on display 318. Exemplary storage device 324 can also store one or more databases for storing suitable information required to implement exemplary embodiments. The databases can be updated by an individual or automatically at a suitable time to add, delete, or update one or more items in the databases. Exemplary storage device 324 can store one or more databases 326 for storing data, and other data/information used to implement exemplary embodiments of the systems and methods described herein.

The computing device 300 can include a network interface 312 configured to interface via one or more network devices 320 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 can include a built-in network adapter, network interface card, PCMCIA network card, card bus network adapter, wireless network adapter, USB network adapter, modem or another device suitable for interfacing the computing device 300 to a type of network capable of communication and performing the operations described herein. Moreover, the computing device 300 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 300 can run an operating system 316, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 316 can be run in native mode or emulated mode. In an exemplary embodiment, the operating system 316 can be run on one or more cloud machine instances.

Figure 4A:
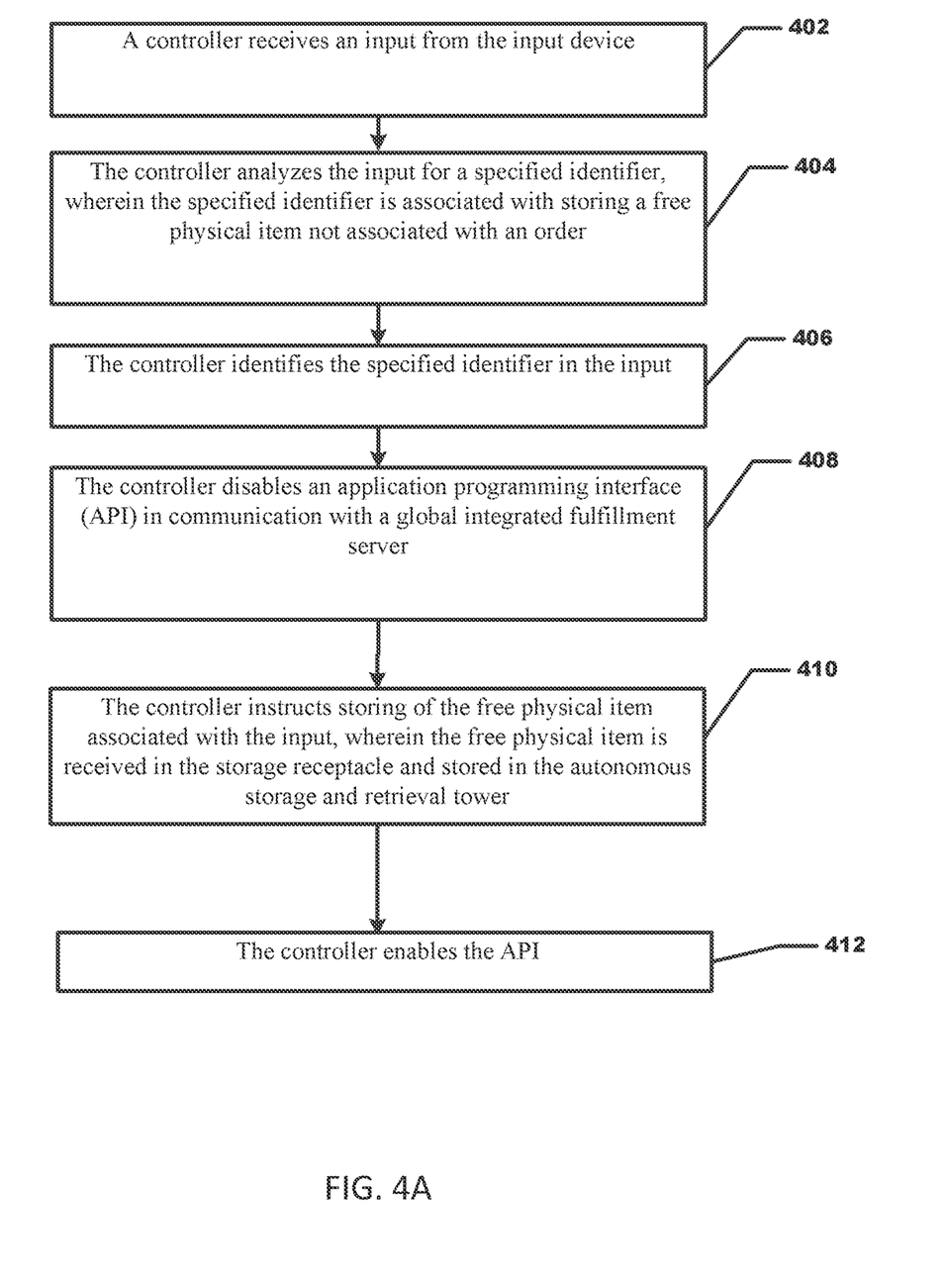
FIGS. 4A-4B are flow diagrams showing illustrative processing that can be implemented with the autonomous storage and retrieval tower in accordance with an example embodiment.
Figure 4B:
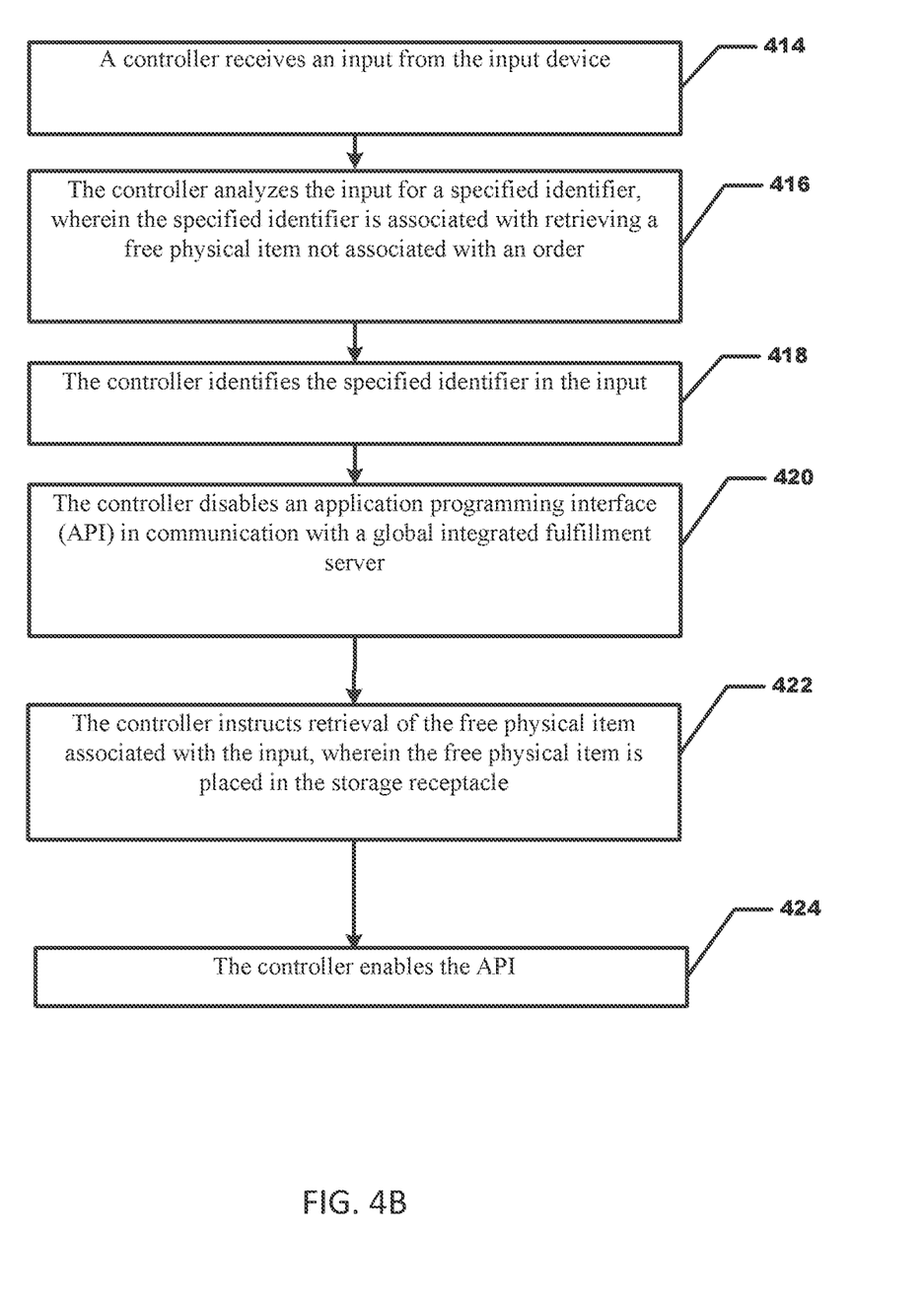

FIGS. 4A-4B are flow diagrams showing illustrative processing that can be implemented within a system for receiving, storing, and dispensing free physical items from an autonomous storage and retrieval tower in an exemplary embodiment. Rectangular elements are herein denoted "processing blocks" and represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

FIG. 4A is a flow diagram illustrating a process for storing a free physical item in the autonomous storage and retrieval tower in accordance with an example embodiment. The controller of the storage tower operates in a normal operating mode at the beginning of the process. At step 402, the controller of the storage tower receives an input from the input device. The input is associated with storing a free physical item in the autonomous storage and retrieval tower. At step 404, the controller analyzes the input for a specified character or sequence of characters in an identifier included in the input, wherein the specified identifier is associated with storing a free physical item not associated with an order. At step 406, the controller identifies the specified identifier in the input. At step 408, the controller enters an exception operating state and disables or does not engage the application programming interface (API) associated with the storage to communicate with the fulfillment server. The fulfillment server tracks physical items within the autonomous storage and retrieval tower. At step 410, the controller instructs storing of the free physical item associated with the input, wherein the free physical item is received in the storage receptacle of the storage tower and stored in the autonomous storage tower. For example, the crane retrieves the free physical item from the storage receptacle and transports the free physical item on the shaft to a shelf to store the free physical item in the storage tower. At step 412, the controller re-enters the normal operating mode and enables the API.

FIG. 4B is a flow diagram illustrating a process for dispensing a free physical item from the autonomous storage and retrieval tower in accordance with an example embodiment. The controller of the storage tower operates in a normal operating mode at the beginning of the process. At step 414, a controller receives an input from the input device. The input is entered by a user for retrieving a free physical item from the storage tower. At step 416, the controller analyzes the input for a specified character or sequence of characters in an identifier included in the input, wherein the specified identifier is associated with retrieving a free physical item not associated with an order. At step 418, the controller identifies the specified identifier in the input. At step 420, the controller enters an exception operating mode and disables or does not engage the application programming interface (API) of the storage tower to communicate with the fulfillment server for tracking the physical items within the storage tower. At step 422, the controller instructs retrieval of the free physical item associated with the input, wherein the free physical item is placed in the storage receptacle. For example, the crane retrieves the free physical item from a shelf in the storage tower and transports the free physical item on the shaft to storage receptacle in the storage tower to dispense the free physical item from the storage receptacle. At step 424, the controller re-enters the normal mode of operation and enables or re-engages the API.

The description is presented to enable a person skilled in the art to create and use a computer system configuration and related method and systems for receiving, storing, and dispensing free physical items from an autonomous storage and retrieval tower. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims. Other technical advantages may become readily apparent to one of ordinary skill in the art after review of the following figures and description.

What is claimed is:

1. An autonomous storage and retrieval system, the system comprising:
   a plurality of storage locations, each of the storage locations configured to support one or more physical items, the one or more physical items including physical items purchased by one or more customers and physical items to be given out for free to a customer of the one or more customers;
   a receptacle for receiving the one or more physical items and for outputting the one or more physical items from the autonomous storage and retrieval system;
   an application programming interface (API) in communication with a fulfillment server for tracking the one or more physical items purchased by the consumers within the autonomous storage and retrieval system;
   an input device for receiving an input from a user for retrieving a physical item of the one or more physical items from the autonomous storage and retrieval system;
   a controller in communication with the API, the controller configured to:
      receive the input from the input device for retrieving the physical item from the autonomous storage and retrieval system;
      determine that the physical item associated with the input and to be retrieved from the autonomous storage and retrieval system is associated with a free physical item to be given out for free to the customer; and
      instruct dispensing of the physical item associated with the input and the free physical item to the customer;
      wherein the customer is permitted to retrieve the physical item and the dispensed free physical item from the receptacle.

2. The system of claim 1, wherein the controller is further configured to:
   analyze the input from the input device for a specified identifier, wherein the specified identifier is associated with the free physical item to be given out for free to the customer; and
   identify the specified identifier in the input.

3. The system of claim 1, wherein the free physical item is a free gift dispensed to the customers.

4. The system of claim 2, wherein the input is an alpha-numerical code.

5. The system of claim 4, wherein the specified identifier is one or more letters or one or more numbers included within the alpha-numerical code.

6. The system of claim 4, wherein the alpha-numeric code is decoded from a barcode.

7. The system of claim 1, wherein the autonomous storage and retrieval system is a tower having a housing.

8. The system of claim 1, wherein the storage locations are shelves.

9. The system of claim 1, wherein the physical item associated with the input and purchased by the consumer is retrieved by the customer from a tray in the receptacle.

10. The system of claim 1, wherein the free physical item is retrieved by the customer from a tray in the receptacle.

11. A method of storing and retrieving one or more physical items, the method comprising:
   providing a plurality of storage locations, each of the storage locations configured to support one or more physical items, the one or more physical items including physical items purchased by one or more customers and physical items to be given out for free to a customer of the one or more customers;
   providing a receptacle for receiving the one or more physical items and for outputting the one or more physical items from the autonomous storage and retrieval system;
   providing an application programming interface (API) in communication with a fulfillment server for tracking the one or more physical items purchased by the consumers within the autonomous storage and retrieval system;
   providing an input device for receiving an input from a user for retrieving a physical item of the one or more physical items from the autonomous storage and retrieval system;
   providing a controller in communication with the API;
   by the controller:
      receiving the input from the input device for retrieving the physical item from the autonomous storage and retrieval system;
      determining that the physical item associated with the input and to be retrieved from the autonomous storage and retrieval system is associated with a free physical item to be given out for free to the customer;
      instructing dispensing of the physical item associated with the input and the free physical item to the customer; and
      permitting the customer to retrieve the physical item and the dispensed free physical item from the receptacle.

12. The method of claim 11, further comprising, by the controller:
   analyzing the input from the input device for a specified identifier, wherein the specified identifier is associated with the free physical item to be given out for free to the customer; and
   identifying the specified identifier in the input.

13. The method of claim 11, wherein the free physical item is a free gift dispensed to the customers.

14. The method of claim 11, wherein the input is an alpha-numerical code.

15. The method of claim 14, wherein the specified identifier is one or more letters or one or more numbers included within the alpha-numerical code.

16. The method of claim 14, wherein the alpha-numeric code is decoded from a barcode.

17. The method of claim 11, wherein the autonomous storage and retrieval system is a tower having a housing.

18. The method of claim 11, wherein the storage locations are shelves.

19. The method of claim 11, further comprising permitting the customer to retrieve the physical item associated with the input and purchased by the consumer from a tray in the receptacle.

20. The method of claim 11, further comprising permitting the customer to retrieve the free physical item from a tray in the receptacle.

* * * * *